(12) United States Patent
Chiba et al.

(10) Patent No.: US 10,917,380 B2
(45) Date of Patent: Feb. 9, 2021

(54) DEVICE AND ASSOCIATED METHODOLOGY FOR COLLECTING COMMUNICATION PARTNER IP ADDRESSES

(71) Applicant: NIPPON TELEGRAPH AND TELEPHONE CORPORATION, Chiyoda-ku (JP)

(72) Inventors: Daiki Chiba, Musashino (JP); Takeshi Yagi, Musashino (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 234 days.

(21) Appl. No.: 15/551,140

(22) PCT Filed: Feb. 12, 2016

(86) PCT No.: PCT/JP2016/054101
§ 371 (c)(1),
(2) Date: Aug. 15, 2017

(87) PCT Pub. No.: WO2016/140037
PCT Pub. Date: Sep. 9, 2016

(65) Prior Publication Data
US 2018/0034766 A1   Feb. 1, 2018

(30) Foreign Application Priority Data
Mar. 5, 2015   (JP) .................................. 2015-043941

(51) Int. Cl.
*H04L 29/12*   (2006.01)
*G06F 21/56*   (2013.01)
*H04L 29/06*   (2006.01)

(52) U.S. Cl.
CPC .......... *H04L 61/1511* (2013.01); *G06F 21/56* (2013.01); *H04L 61/2007* (2013.01); *H04L 63/145* (2013.01); *H04L 63/1425* (2013.01)

(58) Field of Classification Search
CPC ............... H04L 61/1511; H04L 63/145; H04L 63/1425; H04L 61/2007; G06F 21/56
See application file for complete search history.

(56) References Cited

U.S. PATENT DOCUMENTS 6,353,825 B1 *   3/2002   Ponte .................. G06F 16/3326
7,984,163 B2 *   7/2011   Almog .............. H04L 29/12066
                                                            370/386

(Continued)

FOREIGN PATENT DOCUMENTS

JP   2004-274652 A   9/2004
JP   2010-161499 A   7/2010

(Continued)

OTHER PUBLICATIONS

International Search Report dated Mar. 29, 2016, in PCT/JP2016/054101 filed Feb. 12, 2016.

(Continued)

*Primary Examiner* — Nicholas R Taylor
*Assistant Examiner* — Tania M Pena-Santana
(74) *Attorney, Agent, or Firm* — Oblon, McClelland, Maier & Neustadt, L.L.P.

(57) ABSTRACT

A communication partner correspondence relationship collecting device includes a communication partner specifying unit that specifies a subject communication partner whose correspondence relationships are to be collected; a DNS query transmission controller that controls a DNS client such that the DNS client transmits a DNS query to the subject communication partner in a given cycle shorter than a cycle in which the IP address corresponding to the subject (Continued)

communication partner is changed and that collects IP addresses corresponding to the subject communication partner from responses to the DNS queries; and a correspondence relationship log information creator that creates log information from the IP addresses corresponding to the subject communication partner, which are the IP addresses collected by the DNS query transmission controller, and at least one of a set of dates and a set of times at which responses are made to the DNS queries.

10 Claims, 9 Drawing Sheets

(56) References Cited

U.S. PATENT DOCUMENTS

| | | | |
|---|---|---|---|
| 8,347,394 B1* | 1/2013 | Lee | H04L 61/1511 726/22 |
| 8,539,577 B1 | 9/2013 | Stewart et al. | |
| 9,215,123 B1* | 12/2015 | Fears | H04L 67/306 |
| 2005/0172026 A1* | 8/2005 | Jeon | H04L 29/06 709/228 |
| 2008/0155061 A1* | 6/2008 | Afergan | H04L 67/104 709/218 |
| 2010/0332680 A1* | 12/2010 | Anderson | H04L 61/1511 709/245 |
| 2011/0110235 A1* | 5/2011 | Ukita | H04L 47/127 370/235 |
| 2013/0067530 A1* | 3/2013 | Spektor | H04L 41/0893 726/1 |

FOREIGN PATENT DOCUMENTS

| | | | | |
|---|---|---|---|---|
| WO | WO 2009/155453 A1 | | 12/2009 | |
| WO | WO-2009155453 A1 | * | 12/2009 | ....... H04L 29/12066 |

OTHER PUBLICATIONS

Manos Antonakakis et al., "Building a Dynamic Reputation System for DNS," Proc. USENIX conference on Security, 2010, pp. 1-17.
Leyla Bilge et al., "EXPOSURE: Finding Malicious Domains Using Passive DNS Analysis," Proc. NDSS, 2011, pp. 1-17.
Extended European Search Report dated Jan. 29, 2018 in Patent Application No. 16758731.0, 7 pages.
Florian Weimer, "Passive DNS Replication". 17$^{th}$ Annual FIRST Conference on Computer Security, XP055107805, 2005, pp. 1-13.

* cited by examiner

| SERIAL NUMBER | LIST TYPE | DOMAIN NAME, HOST NAME OR FQDN LISTED ON LIST |
|---|---|---|
| 1 | LIST 1 | example.com |
| 2 | LIST 1 | example.net |
| ... | ... | ... |
| 101 | LIST 2 | example.org |
| ... | ... | ... |

FIG.3

| SERIAL NUMBER | LIST TYPE | DOMAIN NAME, HOST NAME OR FQDN LISTED ON LIST | DOMAIN NAME, HOST NAME OR FQDN HAVING, AS SUBDOMAIN, DOMAIN NAME, HOST NAME OR FQDN LISTED ON LIST |
|---|---|---|---|
| 1 | LIST 1 | example.com | foo.example.com, bar.example.com,⋯ |
| 2 | LIST 1 | example.net | baz.example.net,⋯ |
| ... | ... | ... | ... |
| 101 | LIST 2 | example.org | www1.example.org,⋯ |
| ... | ... | ... | ... |

FIG.4

| SERIAL NUMBER | DOMAIN NAME, HOST NAME OR FQDN | LINK METHOD | LINKED URL | EXTRACTED DOMAIN NAME, HOST NAME OR FQDN |
|---|---|---|---|---|
| 1 | example.com | STATIC | http://example.jp/index.php | example.jp |
| ... | ... | ... | ... | ... |
| 11 | foo.example.com | DYNAMIC | http://foo.example.jp/top.jpg | foo.example.jp |
| ... | ... | ... | ... | ... |

FIG.5

| SERIAL NUMBER | SUBJECT DOMAIN NAME, HOST NAME OR FQDN |
|---|---|
| 1 | example.com |
| 2 | foo.example.com |
| 3 | bar.example.com |
| ... | ... |
| 11 | example.net |
| 12 | baz.example.net |
| ... | ... |
| 21 | example.org |
| 22 | www1.example.org |
| ... | ... |
| 31 | example.jp |
| 32 | foo.example.jp |
| ... | ... |

FIG.6

| SERIAL NUMBER | SUBJECT DOMAIN NAME, HOST NAME OR FQDN | MODE OF IP ADDRESS MANAGEMENT IN SUBJECT DOMAIN NAME, HOST NAME OR FQDN | TRANSMISSION SOURCE IP ADDRESS OF DNS CLIENT |
|---|---|---|---|
| 1 | example.com | SINGLE TYPE | SINGLE |
| 2 | foo.example.com | LOAD DISTRIBUTED TYPE | SINGLE |
| 3 | bar.example.com | LOAD DISTRIBUTED TYPE | SINGLE |
| ... | ... | ... | ... |
| 11 | example.net | LOAD DISTRIBUTED TYPE | SINGLE |
| 12 | baz.example.net | LOAD DISTRIBUTED TYPE | SINGLE |
| ... | ... | ... | ... |
| 21 | example.org | REGION DISTRIBUTED TYPE | MULTIPLE |
| 22 | www1.example.org | REGION DISTRIBUTED TYPE | MULTIPLE |
| ... | ... | ... | ... |
| 31 | example.jp | REGION DISTRIBUTED TYPE | MULTIPLE |
| 32 | foo.example.jp | REGION DISTRIBUTED TYPE | MULTIPLE |
| ... | ... | ... | ... |

FIG.7

| SERIAL NUMBER | SUBJECT DOMAIN NAME, HOST NAME OR FQDN | FREQUENCY OF CHANGE OF IP ADDRESS IN SUBJECT DOMAIN NAME, HOST NAME OR FQDN | DNS QUERY TRANSMISSION TIMING |
|---|---|---|---|
| 1 | example.com | - | EVERY DAY (DEFAULT VALUE) |
| 2 | foo.example.com | 1 HOUR | EVERY HOUR |
| 3 | bar.example.com | 2 HOURS | EVERY 2 HOURS |
| ... | ... | ... | ... |
| 11 | example.net | 1 DAY | EVERY DAY |
| 12 | baz.example.net | 2 DAYS | EVERY 2 DAYS |
| ... | ... | ... | ... |
| 21 | example.org | 3 HOURS | EVERY 3 HOURS |
| 22 | www1.example.org | 4 HOURS | EVERY 4 HOURS |
| ... | ... | ... | ... |
| 31 | example.jp | 1 WEEK | EVERY WEEK |
| 32 | foo.example.jp | 2 WEEKS | EVERY 2 WEEKS |
| ... | ... | ... | ... |

FIG.8

| SERIAL NUMBER | TIMESTAMP | IP ADDRESS OF TRANSMISSION SOURCE CLIENT | DOMAIN NAME, HOST NAME OR FQDN | IP ADDRESS CORRESPONDING TO DOMAIN NAME, HOST NAME OR FQDN |
|---|---|---|---|---|
| 1 | 2015-01-01 00:00:00 | 10.0.0.1 | example1.jp | 192.0.2.1 |
| 2 | 2015-01-01 01:00:00 | 10.0.0.1 | example2.jp | 192.0.2.2 |
| ⋮ | ⋮ | ⋮ | ⋮ | ⋮ |
| 101 | 2015-01-02 00:00:00 | 10.0.0.2 | example101.jp | 192.0.2.101 |
| 102 | 2015-01-02 01:00:00 | 10.0.0.2 | example102.jp | 192.0.2.102 |
| ⋮ | ⋮ | ⋮ | ⋮ | ⋮ |
| 201 | 2015-01-03 00:00:00 | 10.0.0.3 | example201.jp | 192.0.2.201 |
| 202 | 2015-01-03 01:00:00 | 10.0.0.3 | example202.jp | 192.0.2.202 |
| ⋮ | ⋮ | ⋮ | ⋮ | ⋮ |

FIG.9

| SERIAL NUMBER | SUBJECT DOMAIN NAME, HOST NAME OR FQDN | CORRESPONDING IP ADDRESS | | | | |
|---|---|---|---|---|---|---|
| | | ... | 2015-01-01 00:00:00 | 2015-01-01 01:00:00 | 2015-01-01 02:00:00 | ... |
| 1 | example.com | ... | 192.0.2.1 | - | - | ... |
| 2 | foo.example.com | ... | 203.0.113.1 | 203.0.113.2 | 203.0.113.3 | ... |
| 3 | bar.example.com | ... | 203.0.113.4 | - | 203.0.113.5 | ... |
| ... | ... | ... | ... | ... | ... | ... |
| 11 | example.net | ... | 192.0.2.11 | - | - | ... |
| 12 | baz.example.net | ... | 192.0.2.12 | - | - | ... |
| ... | ... | ... | ... | ... | ... | ... |
| 21 | example.org | ... | 192.0.2.21,192.0.2.121 | - | - | ... |
| 22 | www1.example.org | ... | 192.0.2.22,192.0.2.122 | - | - | ... |
| ... | ... | ... | ... | ... | ... | ... |
| 31 | example.jp | ... | 192.0.2.31,192.0.2.131 | - | - | ... |
| 32 | foo.example.jp | ... | 192.0.2.32,192.0.2.132 | - | - | ... |
| ... | ... | ... | ... | ... | ... | ... |

DEVICE AND ASSOCIATED METHODOLOGY FOR COLLECTING COMMUNICATION PARTNER IP ADDRESSES

FIELD

The present invention relates to a communication partner correspondence relationship collecting device, a communication partner correspondence relationship collecting method, and a communication partner correspondence relationship collecting program.

BACKGROUND

With the wide use of the Internet, cyberattacks including DDoS attacks and transmission of spam mails are surging. Most of these attacks result from malicious software called malware. Attackers infect terminals and servers of general users with malware, control the terminals and servers unauthorizedly by operating the malware, and implement information collecting and new attacks. These attacks have been a social problem in recent years. For this reason, measures against cyberattacks based on malware infection are urgently needed.

Measures implemented in terminals and measures implemented in networks are used as measures against cyberattacks. Methods using anti-virus software and methods using a host-based IDS (Instruction Detection System) or a host-based IPS (Instruction Prevention System) are used as measures implemented in terminals. In these methods, software is installed in terminals to implement measures.

On the other hand, methods using a network-based IDS or a network-based IPS, a FW (Firewall) or a WAF (Web Application Firewall) are used as measures implemented in networks. In these methods, an examination device is arranged on a communication path in a network. For example, a method of examining communication of DNS queries and DNS responses at a site on the communication path in the network where communication with a DNS server can be monitored has been proposed (for example, see Non Patent Literature 1 or 2). Furthermore, in recent years, SIEM (Security Information and Event Management) services in which logs of terminals and devices are analyzed to find traces of attacks, etc., have been implemented.

In those methods, communication partners of and the communication content of malware infection attacks and other cyberattacks are collected in a decoy system referred to as honey pot. Furthermore, information on communications relevant to attacks is collected in a way that, by using a malware analysis system referred as a sandbox, malware is caused to run actually and partners and the content of communications by malware are collected and in a way that partners and the content of communications that are determined as attacks by a spam mail countermeasure system or a DDoS countermeasure system are collected.

For example, the IP addresses of the communication partners with respect to the collected attacks are blacklisted and communications with the IP addresses are determined as attacks. The information to be blacklisted may be uniform resource locators (URLs) or domain names. In this case, URLs or domain names may be blacklisted by regular expressions.

In general, when traffic logs and alerts are collected from different devices and software and information on communication partners and the content of communication are extracted, notations of items may be different depending on devices and software. In recent years, a technology of converting sets of log information represented by different notations into a uniform notation for tallying has been widely used as SIEM products.

CITATION LIST

Patent Literature

Non Patent Literature 1: Antonakakis, et al., "Building a Dynamic Reputation System for DNS," Proc. USENIX conference on Security, 2010.

Non Patent Literature 2: L. Bilge, et al., "EXPOSURE: Finding Malicious Domains Using Passive DNS Analysis," Proc. NDSS, 2011.

SUMMARY

Technical Problem

The above-described method however does not enable extraction of all used malignant communication partners when information on communication relevant to cyberattacks is collected by using, for example, a honey pot or a sandbox. For example, there are numerous communication partners that are malignant sites collectable by a honey pot and the malignant sites become invalid and transition to other communication partners occur over time.

When malware is analyzed by a sandbox, the malware causes accesses to benign communication partners and accesses to malignant communication partners that vary over time in order to hinder the analysis and check connection to the Internet. As described above, only collecting information on communications relevant to cyberattacks has difficulty in exhaustively and accurately specifying malignant communication partners and blacklisting the malignant communication partners.

For example, Non Patent Literature 1 or 2 proposes a method of using information collected until a certain time point to blacklist malignant communication partners that are unspecified at the time point; however, there is a problem in that it is not possible to specify malignant communication partners that are temporarily used by attackers or malignant communication partners kept by attackers for preparing for attacks.

For this reason, currently, malignant communication partners used for attacks are not necessarily specified even when the latest black list is referred to at a certain time point to find cyberattacks. In this case, log information in which changes over time in the status of correspondence relationships each between a domain name, a host name or a FQDN (Fully Qualified Domain Name) and an IP address are registered is necessary as evidence information for identifying malignant communication partners temporarily used and malignant communication partners used for preparation for attacks.

An objective of the present invention is to create log information in which changes over time in correspondence relationships each between a communication partner and an IP address are incorporated.

Solution to Problem

To solve a problem and to achieve an object, a communication partner correspondence relationship collecting device includes: a communication partner specifying unit that specifies a subject communication partner that is a communication partner corresponding to IP addresses to be collected; a DNS query transmission controller that controls a DNS client such that the DNS client transmits a DNS query to the subject communication partner in a given cycle and collects IP addresses corresponding to the subject communication partner from responses to the DNS queries; and a correspondence relationship log information creator that creates log information from the IP addresses corresponding to the subject communication partner, which are the IP addresses collected by the DNS query transmission controller, and at least one of a set of dates and a set of times at which responses are made to the DNS queries.

A communication partner correspondence relationship collecting method includes: a communication partner specifying step of specifying a subject communication partner that is a communication partner corresponding to IP addresses to be collected;

a DNS query transmission controlling step of controlling a DNS client such that the DNS client transmits a DNS query to the subject communication partner in a given cycle and collecting IP addresses corresponding to the subject communication partner from responses to the DNS queries; and a correspondence relationship log information creating step of creating log information from the IP addresses corresponding to the subject communication partner, which are the IP addresses collected at the DNS query transmission controlling step, and at least one of a set of dates and a set of times at which responses are made to the DNS queries.

A communication partner correspondence relationship collecting program causes a computer to execute: a communication partner specifying step of specifying a subject communication partner that is a communication partner corresponding to IP addresses to be collected; a DNS query transmission controlling step of controlling a DNS client such that the DNS client transmits a DNS query to the subject communication partner in a given cycle and collecting IP addresses corresponding to the subject communication partner from responses to the DNS queries; and a correspondence relationship log information creating step of creating log information from the IP addresses corresponding to the subject communication partner, which are the IP addresses collected at the DNS query transmission controlling step, and at least one of a set of dates and a set of times at which responses are made to the DNS queries.

Advantageous Effects of Invention

According to the present invention, it is possible to create log information in which changes over time in correspondence relationships each between a communication partner and an IP address are incorporated.

DESCRIPTION OF EMBODIMENTS

Embodiments of the communication partner correspondence relationship collecting device, the communication partner correspondence relationship collecting method, and the communication partner correspondence relationship collecting program according to the present invention will be described in detail below with reference to the accompanying drawings. The embodiments do not limit the invention.

Figure 1:
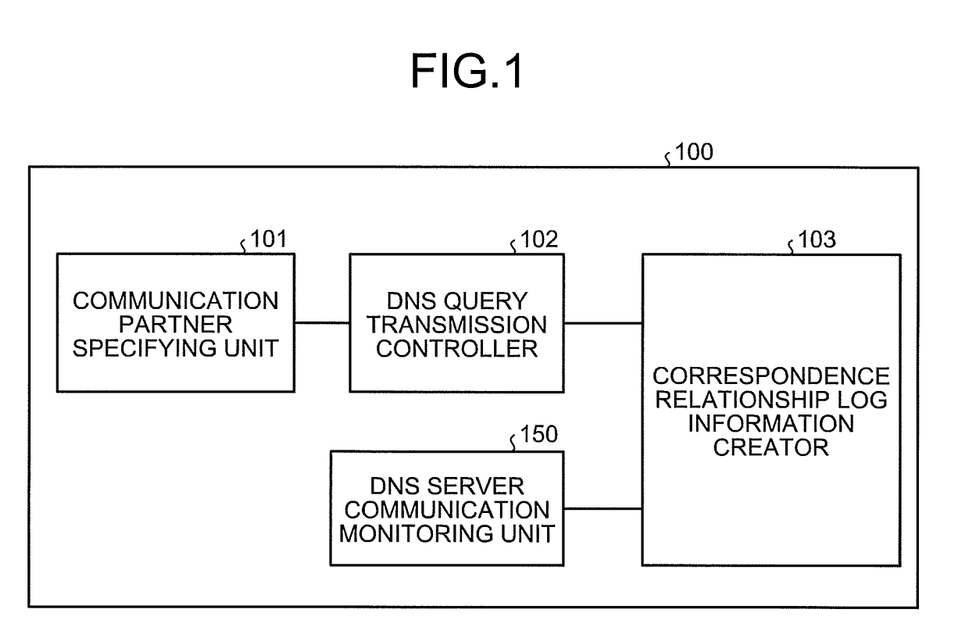
FIG. 1 is a diagram illustrating an exemplary configuration of a communication partner correspondence relationship collecting device according to a first embodiment.

Configuration of Communication Partner Correspondence Relationship Collecting Device According to First Embodiment First of all, with reference to FIG. 1, a configuration of a communication partner correspondence relationship collecting device will be described. FIG. 1 is a diagram illustrating an exemplary configuration of a communication partner correspondence relationship collecting device according to a first embodiment. As illustrated in FIG. 1, a communication partner correspondence relationship collecting device 100 includes a communication partner specifying unit 101, a DNS query transmission controller 102, a correspondence relationship log information creator 103, and a DNS server communication monitoring unit 150. The DNS server communication monitoring unit 150 is not a necessary component and thus the communication partner correspondence relationship collecting device 100 need not necessarily include the DNS server communication monitoring unit 150.

The communication partner specifying unit 101 specifies a subject communication partner that is a communication partner corresponding to IP addresses to be collected. Given lists on each of which domain names, host names or FQDNs are listed are input to the communication partner specifying unit 101. On the basis of the input lists, the communication partner specifying unit 101 specifies a subject communication partner whose correspondence relationships are collected. In the following descriptions, a communication partner refers to a domain name, a host name, or a FQDN, or the like, and communication partners do not include IP addresses unless otherwise denoted.

Figure 2:
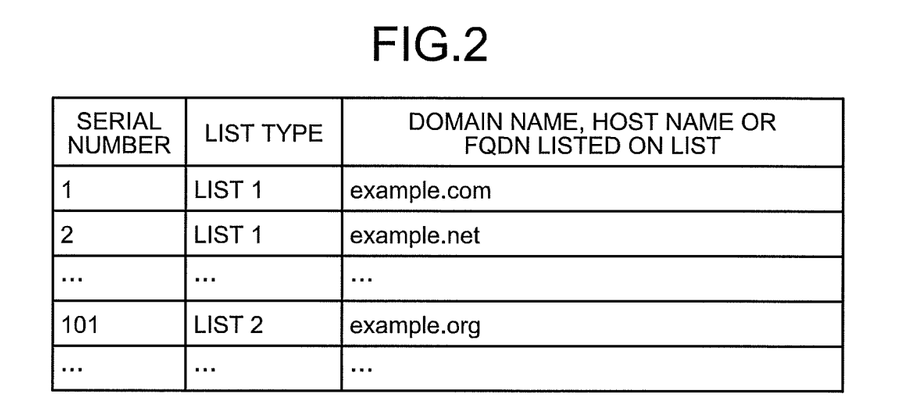
FIG. 2 is a table illustrating exemplary input communication partners in the communication partner correspondence relationship collecting device according to the first embodiment.

Communication partners to be input to the communication partner specifying unit 101 will be described. FIG. 2 is a table illustrating exemplary input communication partners in the communication partner correspondence relationship collecting device according to the first embodiment. As illustrated in FIG. 2, the communication partner specifying unit 101 acquires the input lists and information about the communication partners listed on the lists. The input list of communication partners may include a list of known malignancy communication partners clear to be malignant and a list of known benign communication partners clear to be benign. For example, the row of Serial number 1 in FIG. 2 represents that the communication partner that is the domain name "example.com" listed on the list is collected from the list type "List 1". The input list is not limited to one indicating malignancy or benignity like the above-mentioned malignant communication partner list or the benign communication partner list and it is satisfactory if communication partners are listed.

Figure 3:
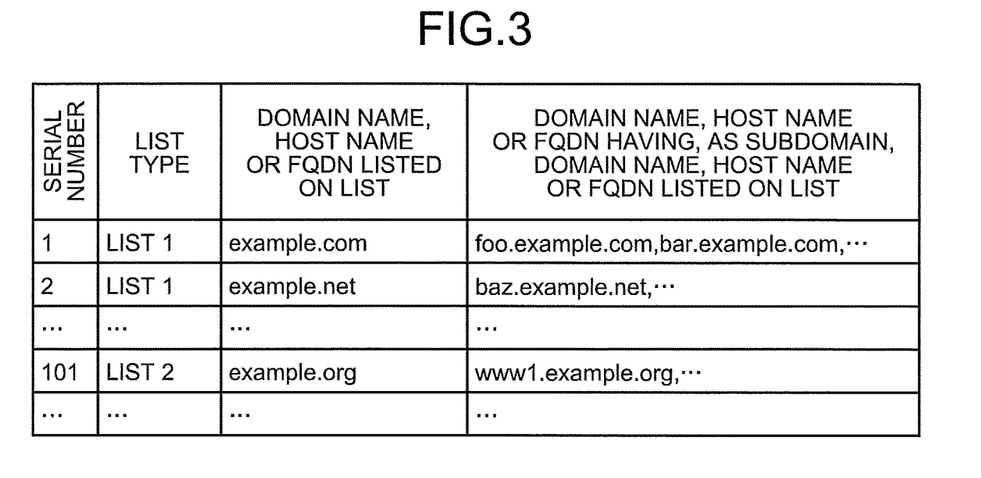
FIG. 3 is a table illustrating exemplary input communication partners and communication partners relevant to the input communication partners in the communication partner correspondence relationship collecting device according to the first embodiment.

As illustrated in FIG. 3, the communication partner specifying unit 101 collects communication partners relevant to the input communication partners listed on the lists. FIG. 3 is a table illustrating exemplary input communication partners and communication partners relevant to the input communication partners in the communication partner correspondence relationship collecting device according to the first embodiment. The communication partner specifying unit 101 collects communication partners each having, as a subdomain, the sub domain of a communication partner listed on the list illustrated in FIG. 2 or a communication partner listed on the list illustrated in FIG. 2. For example, "foo.example.com" and "bar.example.com" are collected as communication partners relevant to the communication partner "example.com" of Serial number 1 in FIG. 3. The method of collecting relevant communication partners may be any method. For example, relevant communication partners may be collected from a search result obtained by searching for communication partners by using a search engine provided by a third party.

Figure 4:
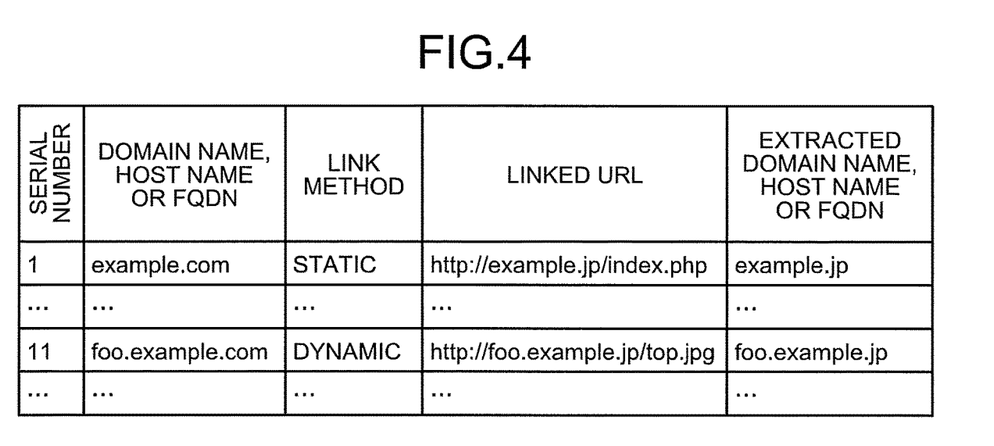
FIG. 4 is a table illustrating exemplary input communication partners and communication partners that are links contained in the content of the input communication partners in the communication partner correspondence relationship collecting device according to the first embodiment.

As illustrated in FIG. 4, the communication partner specifying unit 101 collects input communication partners and communication partners linked to the communication partners relevant to the input communication partners. FIG. 4 is a table illustrating exemplary input communication partners and communication partners that are links contained in the content of the input communication partners in the communication partner correspondence relationship collecting device according to the first embodiment. The communication partner specifying unit 101 accesses the communication partners represented in FIG. 2 or FIG. 3 by using a HTTP or HTTPS protocol to collect the content of the communication partners and collect communication partners from the linked URLs contained in the content.

For example, the case is illustrated where the static link "http://example.jp/index.php" exists in the HTML content when the communication partner "example.com" of Serial number 1 is accessed. In this case, the communication partner specifying unit 101 acquires "example.jp" as a communication partner. When reading the redirect link "http://foo.example.jp/top.jpg" when accessing the communications partner "foo.example.com" of Serial number 11 in FIG. 4, the communication partner specifying unit 101 collects "foo.example.jp" as a communication partner. Methods of collecting contents are not limited to these methods. For example, methods of crawling in a web space represented by search engines may be used.

Figure 5:
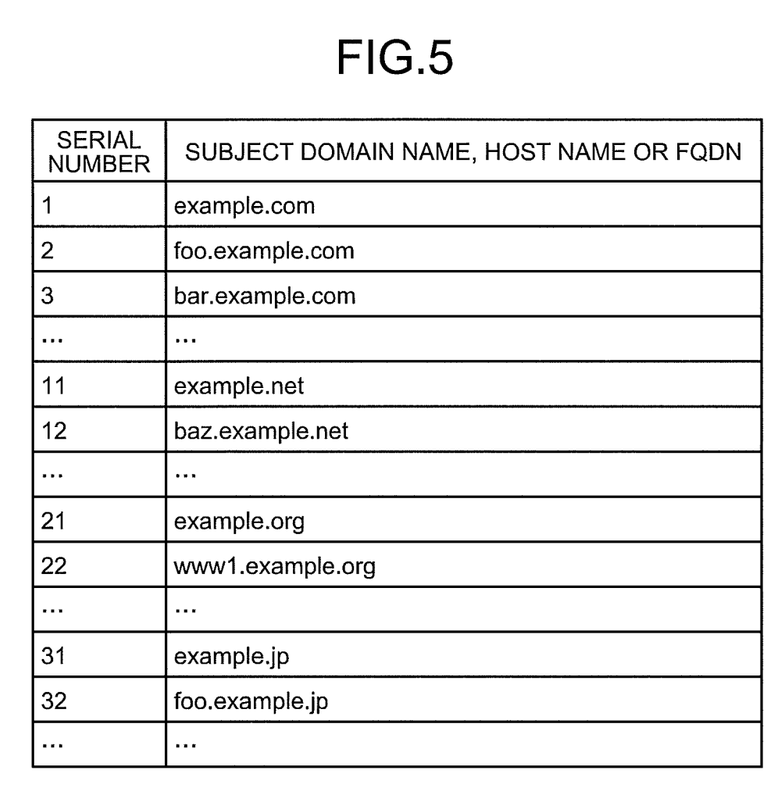
FIG. 5 is a table illustrating exemplary subject communication partners in the communication partner correspondence relationship collecting device according to the first embodiment.

The communication partner specifying unit 101 integrates the communication partners collected by using the method described above and specifies the integrated communication partners as subject communication partners whose corresponding communication partner correspondence relationships are to be collected as illustrated in FIG. 5. FIG. 5 is a table illustrating exemplary subject communication partners in the communication partner correspondence relationship collecting device according to the first embodiment. The method of specifying communication partners for which the collecting is to be performed is not limited to the method described above, and any communication partner may be specified.

The DNS query transmission controller 102 searches for a cycle in which the IP address corresponding to a subject communication partner changes and sets a cycle in which a DNS query is transmitted to a subject communication partner such that the cycle is shorter than the searched cycle. The DNS query transmission controller 102 controls a DNS client to cause the DNS client to transmit a DNS query to the subject communication partner in the set cycle and collects the IP address corresponding to the subject communication partner from the response to the DNS query. When the subject communication partner employs a management mode in which the subject communication partner makes a different response depending on the transmission source IP address, the DNS query transmission controller 102 transmits DSN requests from multiple DNS clients and collects IP addresses corresponding to the subject communication partner from responses to the respective DNS requests.

Figure 6:
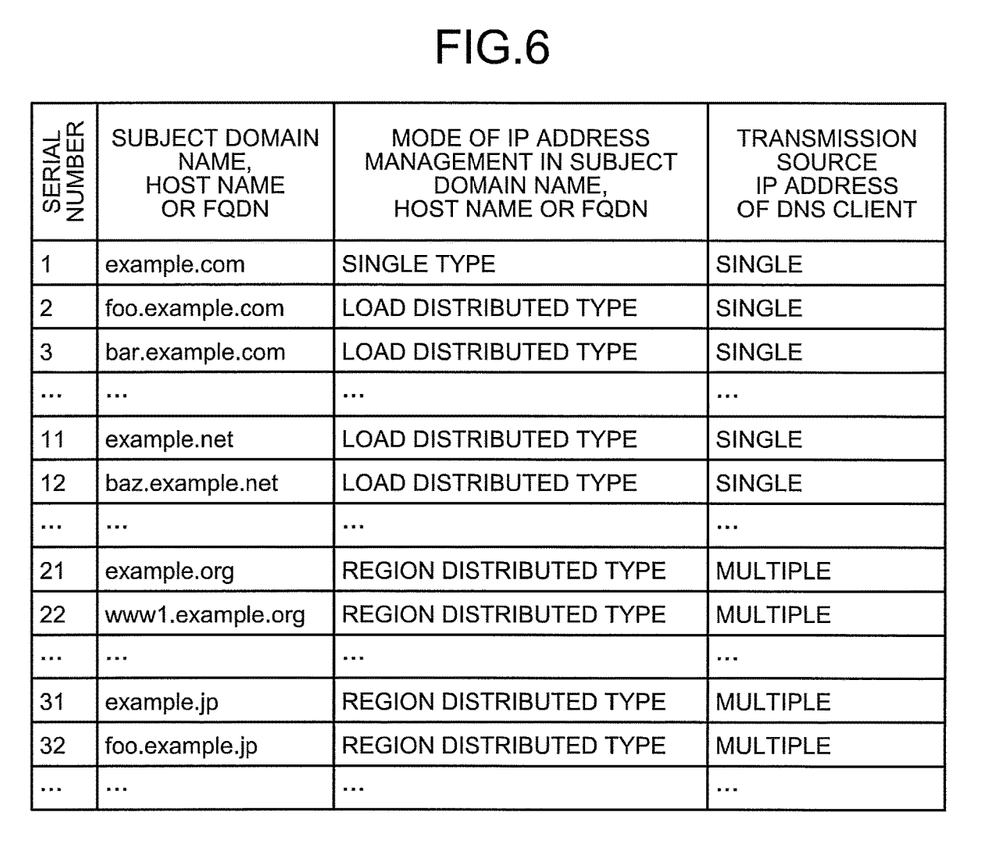
FIG. 6 is a table illustrating exemplary management modes management of subject communication partners and an exemplary control method in the communication partner correspondence relationship collecting device according to the first embodiment.

First of all, the DNS query transmission controller 102 refers to the mode of IP address management of a subject communication partner like that illustrated in FIG. 6. FIG. 6 is a table illustrating exemplary management modes of subject communication partners and an exemplary control method in the communication partner correspondence relationship collecting device according to the first embodiment. The management modes include "single type" where only one IP address is used in a subject communication partner, a "load distribution type" where multiple IP addresses are used for access load distribution in a subject communication partner, or an "region distributed type" where multiple IP addresses distributed to multiple regions for access load distribution in a subject communication partner.

It is possible to specify such management modes by using information opened by business operators that manages the respective communication partners, information searched for and opened by a third party, or information searched for by uniquely accessing each communication partner. For example, Akamai that provides Contents Deliver Network (CDN) that is a known technology for realizing area distribution discloses a list of companies that use CDN from Akamai for their web sites and thus it is possible to specify the communication partners of the web sites of the companies listed on the list as of the region distributed type. The management mode and the method of specifying a management mode are not limited thereto.

As illustrated in FIG. 6, the DNS query transmission controller 102 controls the transmission source IP address of the DNS client according to the specified management mode. For example, in the case of the "single type" management mode, as the response does not change depending on the transmission source IP address, a single transmission source IP address is used. In the case of the "load distribution type", as the response changes depending on the timing at which a DNS query is transmitted but the response does not change depending on the transmission source IP address, a single transmission source IP address is used. DNS queries may be transmitted from different transmission source IP addresses simultaneously to cause load distribution to acquire multiple IP addresses.

In the case of the "region distributed type" management mode, as the response changes according to the region of the transmission source IP address, transmission source IP addresses of multiple regions are used. For example, Serial number 1 in FIG. 6 represents an example where the management mode of the subject communication partner "example.com" is specified as the "single type" and a "single" transmission source IP address is used for the DNS client.

It is possible to use transmission source IP addresses of multiple regions by converting a transmission source IP address into a transmission source IP address of a specified region by using an open VPN relay server available on, for example, "http://www.vpngate.net/ja/". It is also possible to prepare by using by using existing VPN services, or the like. Control on the transmission source IP address according to the management mode or the method of using transmission source IP addresses of multiple regions are not limited to those described above.

Figure 7:
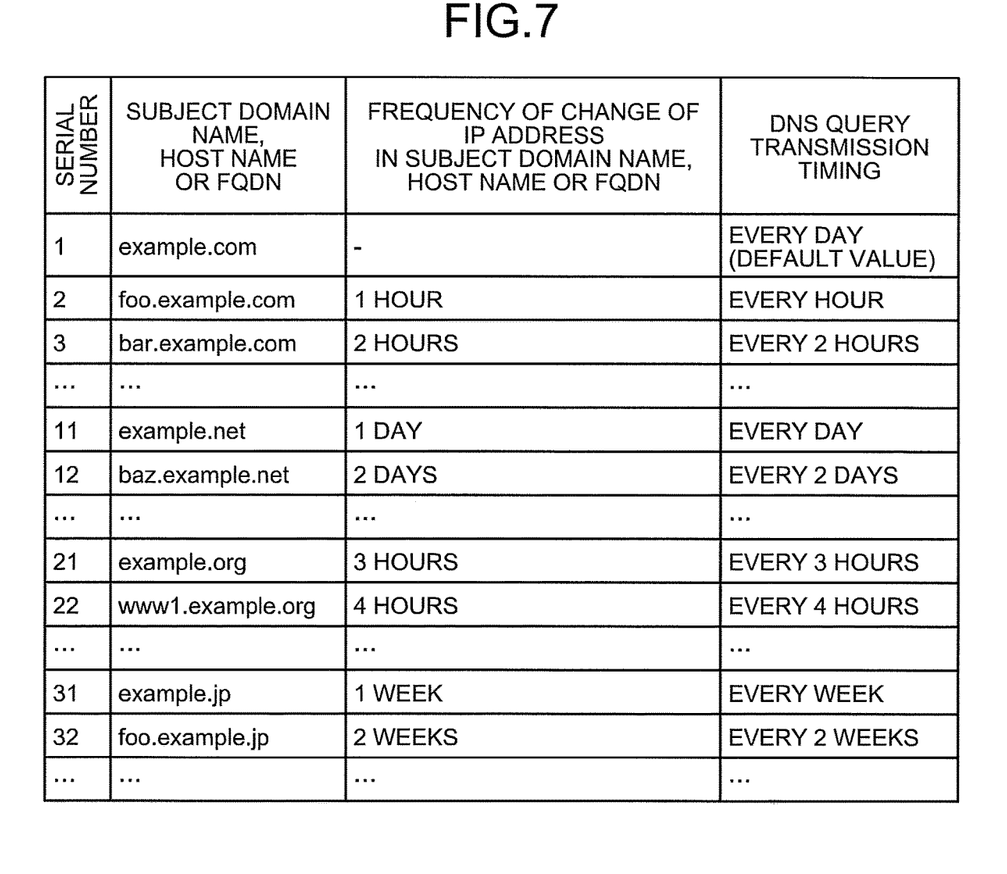
FIG. 7 is a table illustrating exemplary DNS query transmission timings of the communication partner correspondence relationship collecting device according to the first embodiment.

The DNS query transmission controller 102 searches for, with respect to each of the subject communication partners, a cycle in which the IP address in the subject communication partner changes, controls the timings at each of which a DNS query is transmitted from the DNS client according to the result of the search by using the timings illustrated in FIG. 7, and collects correspondence relationships each between a communication partner and an IP address from the responses to the transmitted DNS queries. FIG. 7 is a table illustrating exemplary DNS query transmission timings of the communication partner correspondence relationship collecting device according to the first embodiment, where the cycle of change is a cycle in which the IP address corresponding to the subject communication partner changes and transmission of a DNS query at a given timing shorter than the cycle of change enables exhaustive collection of correspondence relationships before and after the change each between the communication partner and an IP address. It is possible to specify the cycles of change by using information disclosed by the business managers that manage the communication terminal, respectively, information searched for and disclosed by a third party, or information searched for by uniquely accessing each communication partner. For example, it is possible to use, as the cycle of change, the TTL (Time to Live) value that is a parameter for setting a timing at which the cache of the DNS record of each communication partner is updated. In the case of a subject communication partner whose cycle of change cannot be specified, a DNS query is transmitted at a transmission timing that is set as a default value.

For example, "-" is written in Serial number 1 in FIG. 7 because the cycle of change of the subject communication partner "example.com" cannot be specified. In this case, the DNS query transmission controller 102 transmits a DNS query "everyday", which is set as a default value, to the subject communication partner "example.com". In serial number 2 in FIG. 7, the cycle of change of the subject communication partner "foo.example.com" is specified as "one hour". This case illustrates an example where the DNS query transmission controller 102 transmits a DSN query "every hour" to the subject communication partner "foo.example.com". The method of specifying a cycle of change is not limited to the above-described one.

The DNS server communication monitoring unit 150 monitors the DNS servers and collects the IP addresses corresponding to the communication partners. Specifically, the DNS server communication monitoring unit 150 monitors communications by using a given authorized DNS server or a cache DNS server and collects correspondence relationships each between a communication partner and an IP address from the observed DNS queries and the responses. When there is a given DNS server whose communications of DNS queries and DNS responses are observable, it is possible to collect correspondence relationships each between a communication partner and an IP address by observing the communications. The observation method includes a method of monitoring communications on the DNS server and a method of monitoring communications on a network to which the DNS server belongs; however, the method is not limited to these methods.

Figure 8:
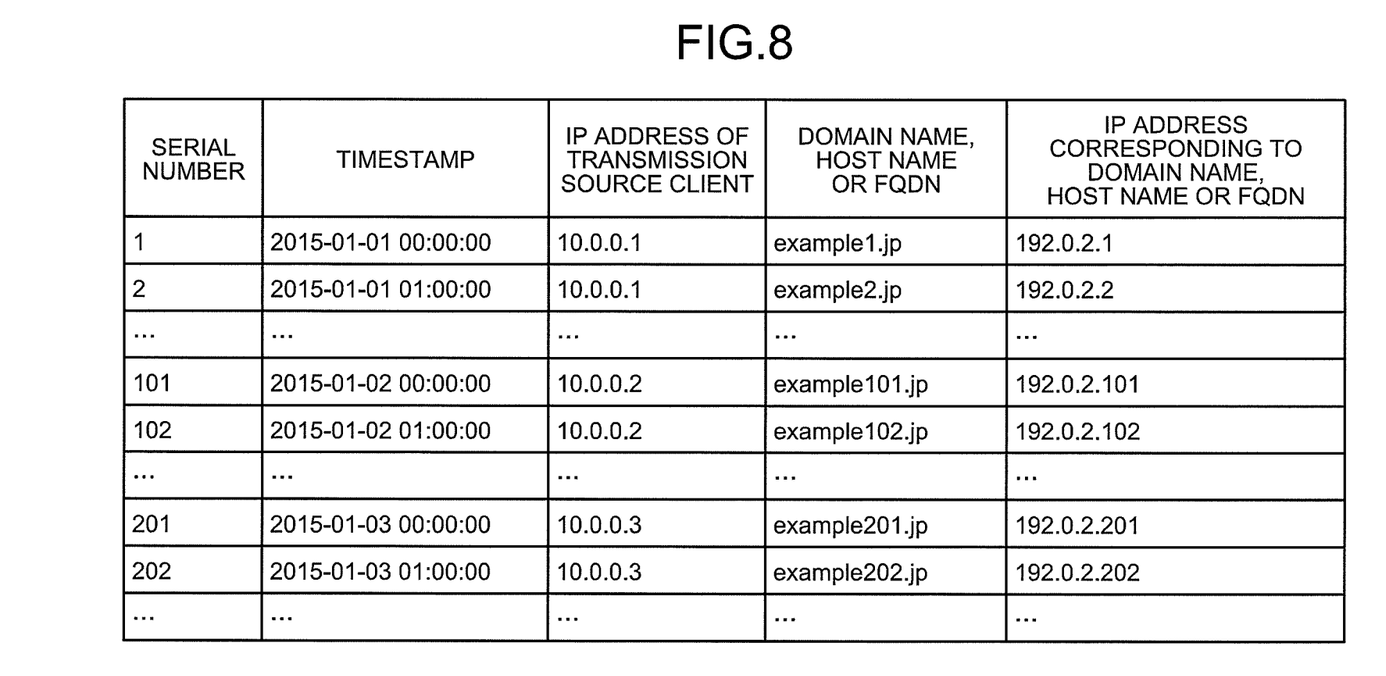
FIG. 8 is a table illustrating exemplary responses observed by the communication partner correspondence relationship collecting device according to the first embodiment.

The correspondence relationships each between a communication partner and an IP address that are collected by the DNS query transmission controller 102 and the DNS server communication monitoring unit 150 will be described with reference to FIG. 8. FIG. 8 is a table illustrating exemplary responses observed by the communication partner correspondence relationship collecting device according to the first embodiment. For example, Serial number 1 in FIG. 8 represents the example a DNS query to the communication partner "example1.jp" is transmitted from the client having the transmission source IP address "10.0.0.1" at the time point "2015-01-01 00:00:00" and it is observed that the IP address corresponding to "example.jp" is "192.0.2.1" according to the DNS response to the DNS query.

Figure 9:
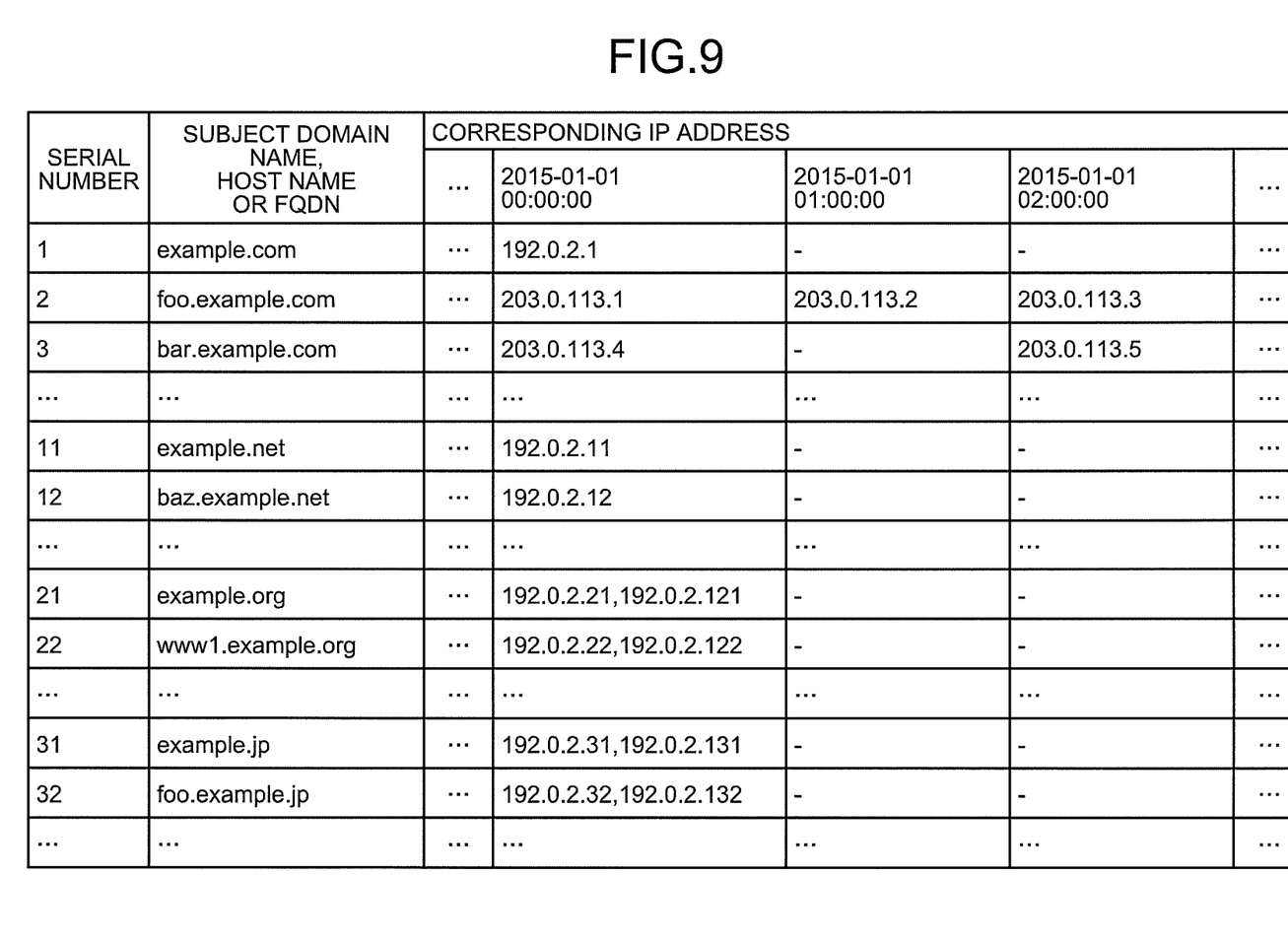
FIG. 9 is a table illustrating exemplary log information about correspondence relationships each between a communication partner and an IP address, which are correspondence relationships collected by the communication partner correspondence relationship collecting device according to the first embodiment.

The correspondence relationship log information creator 103 creates log information from IP addresses corresponding to subject communication partners, which are IP addresses collected by one of or both the DNS query transmission controller 102 and the DNS server communication monitoring unit 150, and at least one of the dates and times on and at which responses are made to DNS queries. For example, as illustrated in FIG. 9, the correspondence relationship log information creator 103 may create, as log information, the result of IP addresses corresponding to the subject communication partners represented together with time information. For example, Serial number 1 in FIG. 9 represents the example where the IP address "192.0.2.1" corresponds to the subject communication partner "example.com" at the time point "2015-01-01 00:00:00". Serial number 2 in FIG. 9 represents the example where the IP address "203.0.113.1" corresponds to the subject communication partner "foo.example.com" at the time point "2015-01-01 00:00:00", the IP address "203.0.113.2" corresponds to the subject communication partner "foo.example.com" at the time point "2015-01-01 01:00:00", and the IP address "203.0.113.3" corresponds to the subject communication partner "foo.example.com" at the time point "2015-01-01 02:00:00". Serial number 21 in FIG. 9 represents the example where the IP address "192.0.2.21 and 192.0.2.121" correspond to the subject communication partner "example.org" at the time point "2015-01-01 00:00:00".

FIG. 9 illustrates an exemplary case where the log information is created from both the dates and times. Alternatively, the log information may be created from any one of the sets of dates and the sets of times. For example, log information may be created with respect to each of "2015-

01-01", "2015-01-02" and "2015-01-03" or log information may be created with respect to each of "01:00:00", "02:00:00" and "03:00:00".

Figure 10:
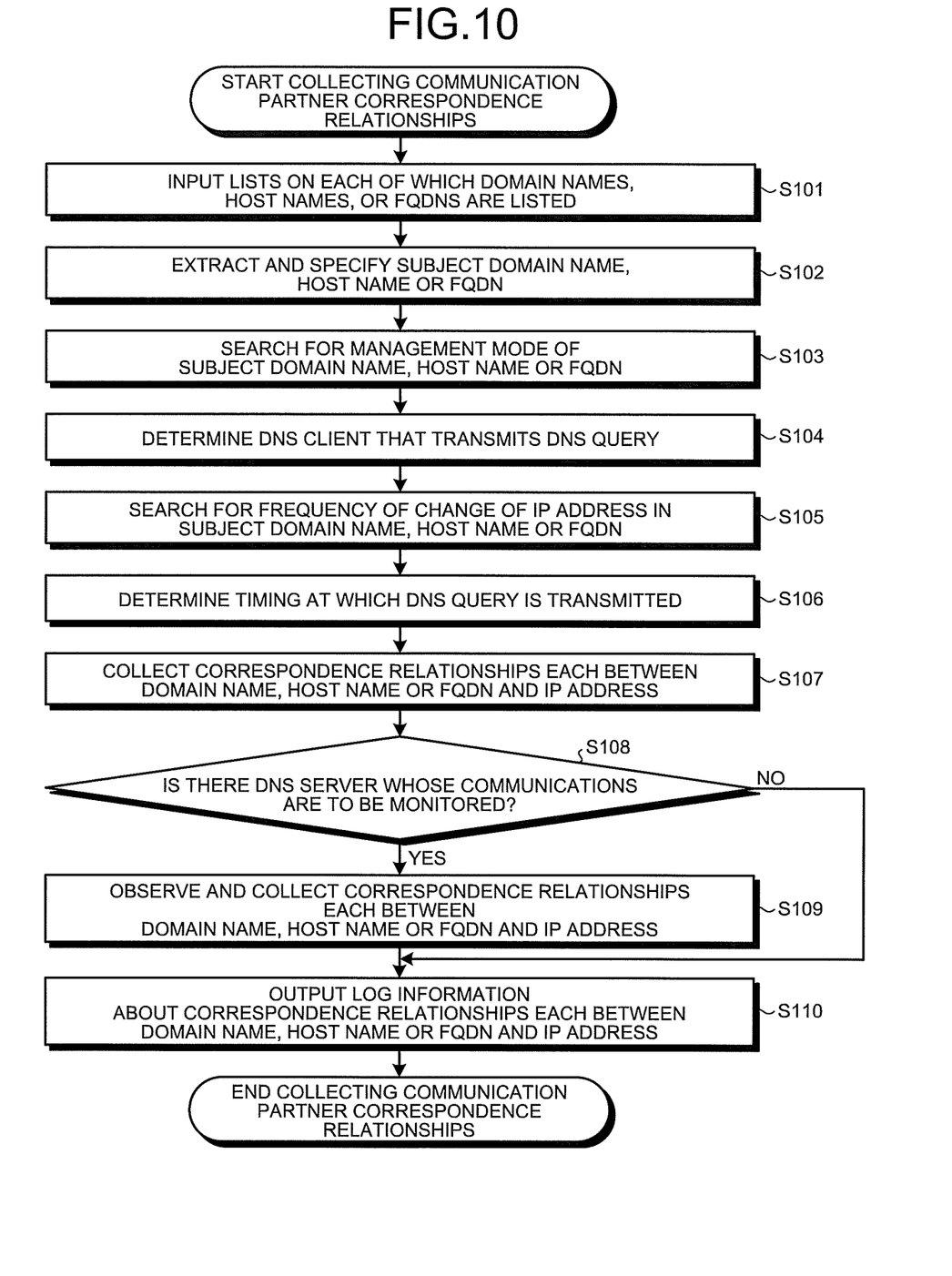
FIG. 10 is a chart illustrating an exemplary process performed by the communication partner correspondence relationship collecting device according to the first embodiment.

Process performed by Communication Partner Correspondence Relationship Collecting Device With reference to FIG. 10, a process performed by the communication partner correspondence relationship collecting device 100 will be described. FIG. 10 is a chart illustrating an exemplary process performed by the communication partner correspondence relationship collecting device according to the first embodiment.

As illustrated in FIG. 10, first of all, lists on each of which domain names, host names, or FQDNs are listed are input to the communication partner specifying unit 101 (step S101). The communication partner specifying unit 101 extracts a subject domain name, a host name, or a FQDN and specifies the subject domain name, the host name, or the FQDN as a subject communication partner (step S102).

The DNS query transmission controller 102 then searches for a management mode of the subject domain name, the host name, or the FQDN (step S103). The DNS query transmission controller 102 determines a DNS client that transmits a DNS query (step S104). The DNS query transmission controller 102 searches for the frequency of change of the IP address in the subject domain name, the host name, or the FQDN (step S105), determines a timing at which a DNS query is transmitted on the basis of the search result (step S106), transmits DNS queries, and collects correspondence relationships each between the domain name, the host name, or the FQDN and an IP address (step S107).

When there is a DNS server whose communications are to be monitored (YES at step S108), the DNS server communication monitoring unit 150 observes and collects correspondence relationships each between the domain name, the host name, or the FQDN and an IP address (step S109). The correspondence relationship log information creator 103 outputs the log information about correspondence relationships each between the domain name, the host name, or the FQDN and an IP address (step S110).

Effect of First Embodiment

The communication partner specifying unit 101 specifies a subject communication partner that is a communication partner corresponding to an IP address that is to be collected. The DNS query transmission controller 102 controls a DNS client such that the DNS client transmits a DNS query to the subject communication partner in a cycle shorter than a given cycle and collects IP addresses corresponding to the subject communication partner from responses to DNS queries. The correspondence relationship log information creator 103 creates log information from the IP addresses corresponding to the subject communication partner, which are the IP addresses collected by the DNS query transmission controller 102, and the times at which the responses are made to the DNS queries. Accordingly, even when the IP address corresponding to the subject communication partner changes, it is possible to create log information in which changes over time in the relationship between the communication partner and the IP address are incorporated.

Searching for a cycle at which the IP address corresponding to the subject communication partner changes and then setting a cycle in which an IP address is collected such that the cycle is shorter than the given cycle make it possible to collect correspondence relationships each between the communication partner and an IP address at a cycle shorter than the cycle at which the IP address corresponding to the subject communication partner changes and thus to accurately acquire changes over time. Note that it is possible to use the log information created by the communication partner correspondence relationship collecting device 100 to create a blacklist of communication partners and calculate malignancy.

The communication partner specifying unit 101 may include, in subject communication partners, communication partners having the subdomain of the subject communication partner and the communication partner as subdomains and links contained in the contents of the subject communication partner. Accordingly, it is possible to collect correspondence relationships about more communication partners.

The cycle in which the IP address corresponding to the subject communication partner changes is searched for and a cycle in which an IP address is collected is set such that the cycle is shorter than the cycle in which the IP address changes. Accordingly, it is possible to collect a correspondence relationship between the communication partner and an IP address in the cycle shorter than the cycle in which the IP address corresponding to the subject communication partner changes and thus to collect correspondence relationships exhaustively.

The DNS server communication monitoring unit 150 monitors the DSN server, collects IP addresses corresponding to the subject communication partner and the correspondence relationship log information creator 103 creates log information from the IP addresses corresponding to the subject communication partner, which are the IP addresses collected by the DNS server communication monitoring unit 150, and the times at each of which a response is made to a DNS query. Accordingly, it is possible to acquire the IP addresses corresponding to the subject communication partner without any transmission of DNS queries from the DNS client.

When the communication partner employs a management mode in which a different response is made depending on the transmission source IP address, the DNS query transmission controller 102 transmits DNS requests from multiple DNS clients and collects IP addresses corresponding to the subject communication partner from the responses to the respective DNS requests. Accordingly, it is possible to deal with the case where there are multiple IP addresses corresponding to a subject communication partner.

The subject communication partner includes at least one of a domain name, a host name and a FQDN. As a domain name, a host name, or a FQDN may include a sub domain or may be included as a subdomain, it is possible to collect correspondence relationships in which relevant communication partners are incorporated.

System Configuration

Each of the components of each of the devices illustrated in the drawings is a functional idea and therefore they need not necessarily be configured physically as illustrated in the drawings. In other words, specific modes of dispersion and integration of each device are not limited to those illustrated in the drawings. All or part of the each device may be configured in a distributed or integrated manner in a given unit according to various types of load and the use thereof. Furthermore, all or part of each processing function implemented by each processor may be implemented by a CPU (Central Processing Unit) and a program that is analyzed and executed by the CPU or may be implemented as hardware using a wired logic.

All or part of each process described in the embodiment as one performed automatically may be performed manually or all or part of each described as one performed manually may be performed automatically by using a known method.

Furthermore, the process procedures, control procedures, specific names, information containing various types of data and parameters described in the document and drawings may be changed freely unless otherwise denoted.

Program

A program written in a computer-executable language may be created for the processes executed by the communication partner correspondence relationship collecting device described in the above-described embodiment. In this case, a computer executes the program and accordingly the same effect as that of the embodiment can be achieved. Furthermore, the program may be recorded in a computer-readable recording medium and the program stored in the recording medium may be read and executed by the computer to realize the same processes as those of the above-described embodiment. An exemplary computer that executes a program that implements the same functions as those of the communication partner correspondence relationship collecting device illustrated in FIG. 1 will be described.

Figure 11:
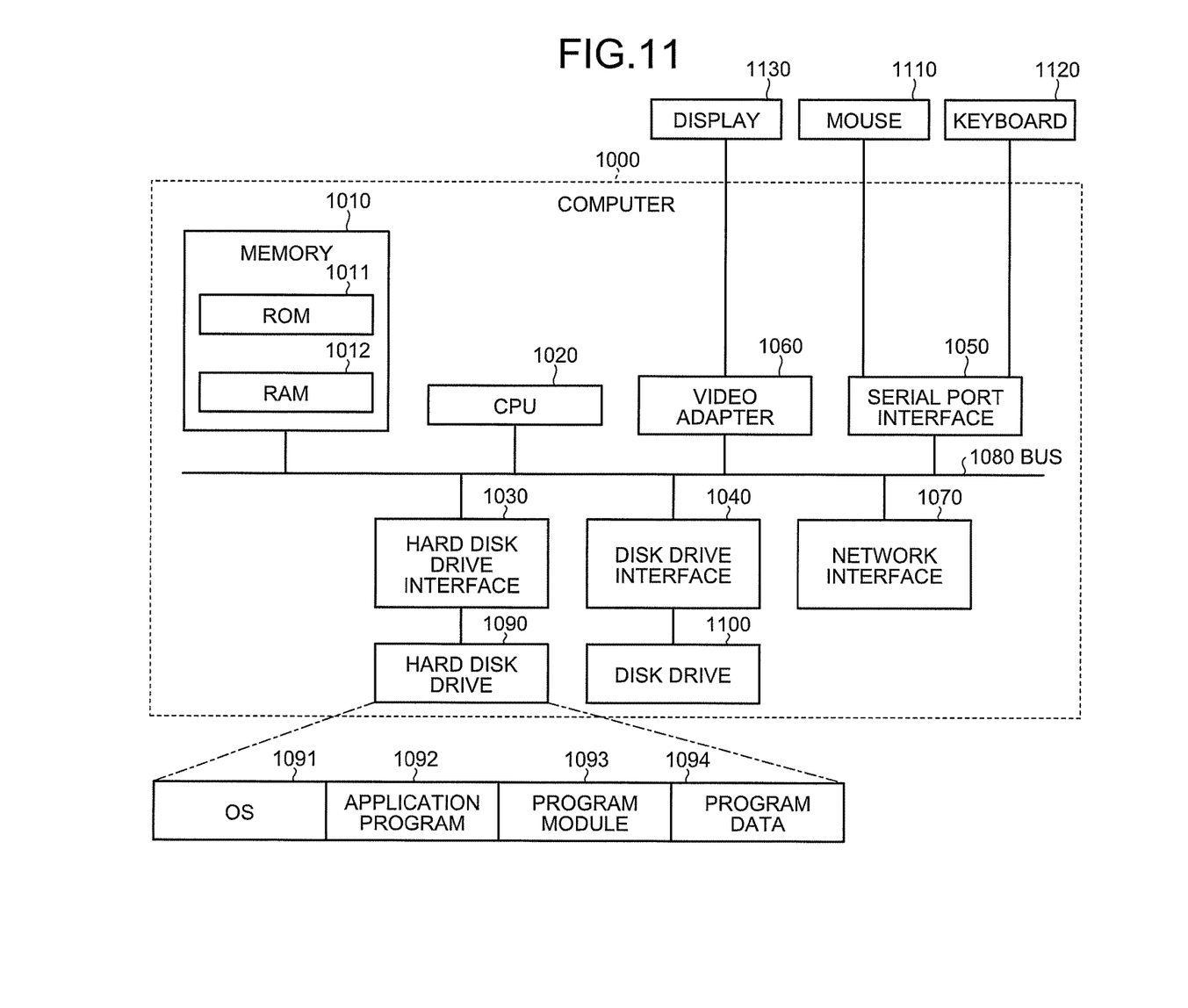
FIG. 11 is a diagram illustrating an exemplary computer that functions as the communication partner correspondence relationship collecting device.

FIG. 11 is a diagram of an exemplary computer that functions as the communication partner malignancy calculation device. As exemplified in FIG. 11, a computer 1000 includes, for example, a memory 1010, a CPU 1020, a hard disk drive interface 1030, a disk drive interface 1040, a serial port interface 1050, a video adapter 1060, and a network interface 1070 that are connected via a bus 1080.

As exemplified in FIG. 11, the memory 1010 includes a ROM (Read Only Memory) 1011 and a RAM (Random Access Memory) 1012. The ROM 1011 stores, for example, a boot program, such as a BIOS (Basic Input Output System). The hard disk drive interface 1030 is connected to a hard disk drive 1090 as exemplified in FIG. 11. The disk drive interface 1040 is connected to a disk drive 1100 as exemplified in FIG. 11. For example, a detachable storage medium, such as a magnetic disk or an optical disk, is inserted into the disk drive 1100. The serial port interface 1050 is connected to, for example, a mouse 1110 and a keyboard 1120 as exemplified in FIG. 11. The video adapter 1060 is connected to, for example, a display 1130 as exemplified in FIG. 11.

As exemplified in FIG. 11, the hard disk drive 1090 stores, for example, an OS 1091, an application program 1092, a program module 1093, and program data 1094. In other words, the program is stored in, for example, the hard disk drive 1090 as a program module in which commands to be executed by the computer 1000 are written.

Furthermore, the various types of data described in the above-described embodiment are stored as program data in, for example, the memory 1010 or the hard disk drive 1090. The CPU 1020 reads the program module 1093 and the program data 1094, which are stored in the memory 1010 or the hard disk drive 1090, into the RAM 1012 and executes them as required.

Storing the program module 1093 and the program data 1094 according to the program is not limited to storing them in the hard disk drive 1090. They may be stored in, for example, a detachable storage medium and may be read by the CPU 1020 via the disk drive 1100, or the like. Alternatively, the program module 1093 and the program data 1094 according to the program may be stored in another computer that is connected via a network (such as a LAN (Local Area Network) or a WAN (Wide Area Network)) and may be read by the CPU 1020 via the network interface 1070. Reference Signs List

100 COMMUNICATION PARTNER CORRESPONDENCE RELATIONSHIP COLLECTING DEVICE

101 COMMUNICATION PARTNER SPECIFYING UNIT
102 DNS QUERY TRANSMISSION CONTROLLER
103 CORRESPONDENCE RELATIONSHIP LOG INFORMATION CREATOR
150 DNS SERVER COMMUNICATION MONITORING UNIT

The invention claimed is:

1. A communication partner correspondence relationship collecting device comprising:
circuitry including at least a processor and a memory coupled to the processor, the circuitry being configured to
specify a subject communication partner that is a communication partner corresponding to an Internet protocol (IP) addresses to be collected;
determine a periodic cycle in which the IP addresses corresponding to the subject communication partner change in order to set a length of a periodic collection cycle to be shorter than the periodic cycle in which the IP addresses corresponding to the subject communication partner change;
control a domain name system (DNS) client such that the DNS client transmits a DNS query to the subject communication partner in the periodic collection cycle that is shorter than the periodic cycle in which the IP addresses corresponding to the subject communication partner change, and collect IP addresses corresponding to the subject communication partner from responses to the DNS queries; and
create log information from the IP addresses corresponding to the subject communication partner, which are the IP addresses collected, and at least one of a set of dates and a set of times at which responses are made to the DNS queries.

2. The communication partner correspondence relationship collecting device according to claim 1, wherein the circuitry includes, in subject communication partners, a communication partner having a subdomain of the communication partner and the communication partner as a subdomain and a link contained in the content of the subject communication partner.

3. The communication partner correspondence relationship collecting device according to claim 1, wherein the circuitry further monitors a DNS server and collects the IP addresses corresponding to the subject communication partner, and
creates the log information from the IP addresses corresponding to the subject communication partner, which are the IP addresses collected, and at least one of the set of dates and the set of times at which responses are made to the DNS queries.

4. The communication partner correspondence relationship collecting device according to claim 1, wherein, when the subject communication partner employs a management mode in which a different response is made depending on a transmission source IP address, the circuitry transmits DNS requests from multiple DNS clients and collects IP addresses corresponding to the subject communication partner from responses to the respective DNS requests.

5. The communication partner correspondence relationship collecting device according to claim 1, wherein the subject communication partner contains at least one of a domain name, a host name and a fully qualified domain name (FQDN).

6. A communication partner correspondence relationship collecting method comprising:

specifying a subject communication partner that is a communication partner corresponding to internet protocol (IP) addresses to be collected;

determining a periodic cycle in which the IP addresses corresponding to the subject communication partner change in order to set a length of a periodic collection cycle to be shorter than the periodic cycle in which the IP addresses corresponding to the subject communication partner change;

controlling a domain name system (DNS) client such that the DNS client transmits a DNS query to the subject communication partner in the periodic collection cycle that is shorter than the periodic cycle in which the IP addresses corresponding to the subject communication partner change, and collecting IP addresses corresponding to the subject communication partner from responses to the DNS queries; and creating log information from the IP addresses corresponding to the subject communication partner, which are IP addresses collected, and at least one of a set of dates and a set of times at which responses are made to the DNS queries.

7. A non-transitory, computer-readable recording medium having stored a communication partner correspondence relationship collecting program that causes a computer to execute a process comprising:

specifying a subject communication partner that is a communication partner corresponding to internet protocol (IP) addresses to be collected;

determining a periodic cycle in which the IP addresses corresponding to the subject communication partner change in order to set a length of a periodic collection cycle to be shorter than the periodic cycle in which the IP addresses corresponding to the subject communication partner change;

controlling a domain name system (DNS) client such that the DNS client transmits a DNS query to the subject communication partner in the periodic collection cycle that is shorter than the periodic cycle in which the IP addresses corresponding to the subject communication partner change, and collecting IP addresses corresponding to the subject communication partner from responses to the DNS queries; and creating log information from the IP addresses corresponding to the subject communication partner, which are the IP addresses collected, and at least one of a set of dates and a set of times at which responses are made to the DNS queries.

8. The communication partner correspondence relationship collecting device according to claim 1, wherein the circuitry causes a plurality of DNS queries to be transmitted simultaneously in order to cause load distribution in the subject communication partner to collect multiple IP addresses.

9. The communication partner correspondence relationship collecting device according to claim 1, wherein the circuitry sets the periodic collection cycle to a time to live (TTL) value.

10. The communication partner correspondence relationship collecting device according to claim 1, wherein the periodic collection cycle is a frequency with which the DNS query is transmitted.

* * * * *